United States Patent [19]

Coggin, Jr. et al.

[11] 3,986,853
[45] Oct. 19, 1976

[54] CONTROL SYSTEM FOR THE DRAWING OF GLASS FIBERS

[75] Inventors: Charles H. Coggin, Jr., Glendora, Calif.; Stanley H. Shepherd, Marshalltown, Iowa; John L. Jones, Jr., Duarte, Calif.

[73] Assignee: Kaiser Glass Fiber Corporation, Azusa, Calif.

[22] Filed: Aug. 8, 1975

[21] Appl. No.: 603,117

[52] U.S. Cl. .................................. 65/2; 65/11 W; 65/12; 65/29
[51] Int. Cl.² ........................................ C03B 37/02
[58] Field of Search ............... 65/1, 2, 11 W, 12, 29

[56] References Cited
UNITED STATES PATENTS

| | | | |
|---|---|---|---|
| 3,475,148 | 10/1969 | Higginbotham | 65/11 W X |
| 3,649,231 | 3/1972 | Trethewey | 65/12 X |
| 3,905,790 | 9/1975 | Strickland | 65/2 |

Primary Examiner—Robert L. Lindsay, Jr.
Attorney, Agent, or Firm—Naylor, Neal & Uilkema

[57] ABSTRACT

A control system for use in combination with a bushing assembly of the type wherein glass fibers are drawn through an orifice plate having a flat undersurface against which bulk gas is directed to effect cooling and fiber attenuation. The system controls operation in the event of fiber "break out," by lowering the temperature of the bushing assembly, increasing the rate of flow of bulk gas against the orifice plate, controlling the drawing action of the collet used to draw fibers from the plate, and spraying cooling water against the fibers being drawn from the plate. Control is effected through means of a common main control unit and manual controls are provided to permit operation of the control system to selectively control the operating mode of the system and increase the bulk flow of gas for orifice plate clearing purposes.

8 Claims, 4 Drawing Figures

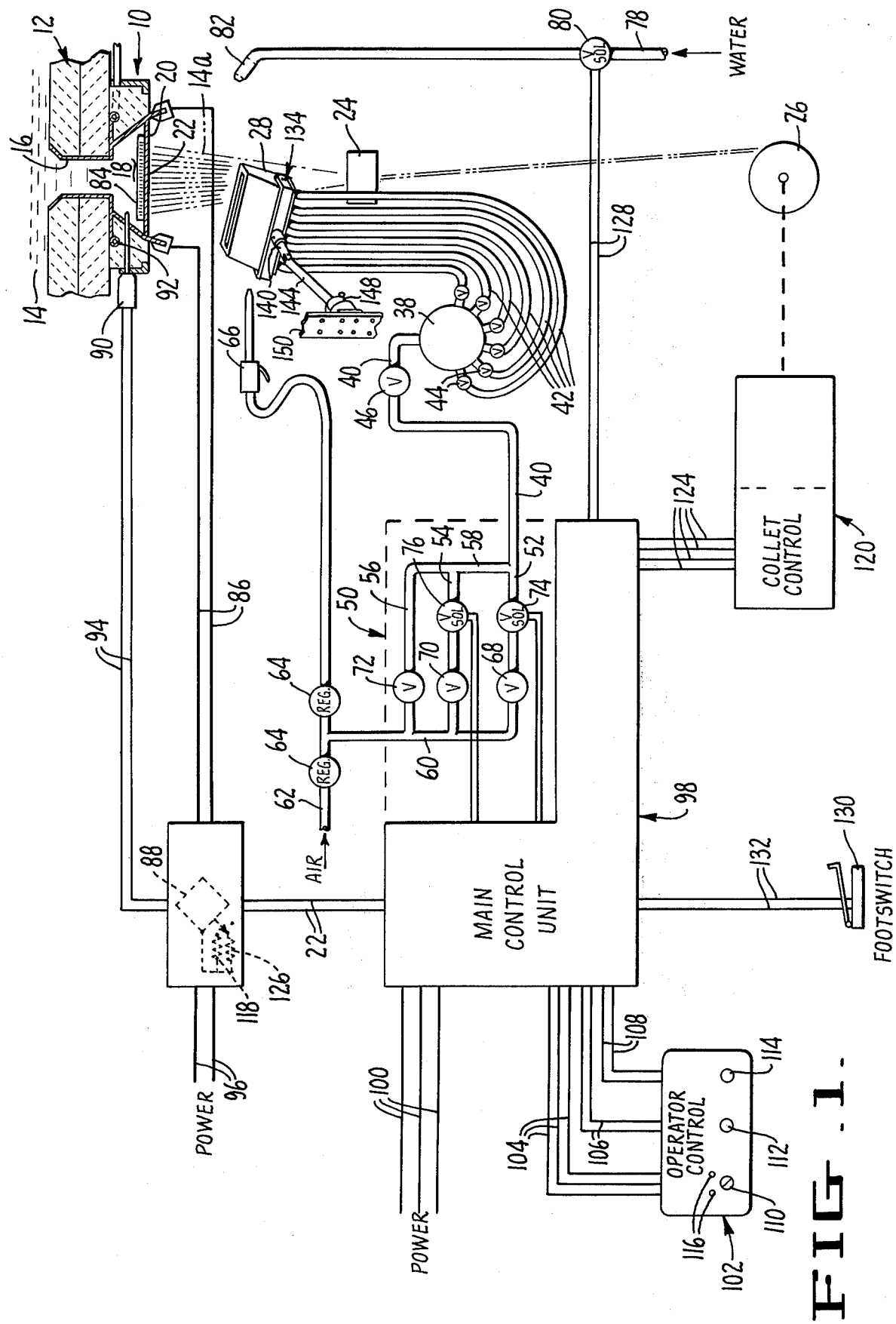

CONTROL SYSTEM FOR THE DRAWING OF GLASS FIBERS

BACKGROUND OF THE INVENTION

The present invention relates to a control system for a bushing assembly used in the drawing of glass fibers. The invention is particularly concerned with such a system to control bushing operation in the event of fiber break out.

In its more specific aspects, the invention is concerned with a control system for use with a bushing assembly of the type disclosed in the co-pending application, Ser. No. 599,720 filed on July 28, 1975 by Charles H. Coggin, Jr., one of the inventors here, said application being entitled ASSEMBLY FOR THE DRAWING OF GLASS FIBERS.

SUMMARY OF THE INVENTION

The present invention may be defined as an improvement for controlling the operation of a bushing assembly of the type having: an orifice plate with a flat undersurface through which fibers are drawn, a collect for drawing glass from the plate, a supply nozzle for directing bulk gas against the undersurface of the plate, and an electrical current heater for heating molten glass within the bushing assembly to condition the glass for drawing through the orifice plate. The control system comprises means to selectively reduce the drawing action of the collet, increase the bulk flow of gas through the supply nozzle, and lower the temperature to which the heater heats molten glass within the bushing; and, operating means to coordinate the operation of the control means whereby, in the event of fiber break out, the rate of drawing by the collet is reduced, bulk gas flow to the undersurface of the orifice plate is increased, and the temperature of the bushing is lowered.

A principal object of the invention is to provide a control system which minimizes the extent of fiber breakage and orifice plate flooding in the event of fiber break out.

A related and more specific object of the invention is to provide a control system which, in the event of fiber break out, effects the immediate cooling of the orifice plate and the glass being drawn therethrough.

Still another object of the invention is to control and reduce the pulling action of the collet so that that action will not contribute to continued fiber breakage in the event of fiber break out.

Yet another object of the invention is to provide a controlled bulk gas supply system wherein the amount of gas flow can be instanteously adjusted to accommodate different operating conditions.

Still another object of the invention is to provide a bulk flow gas nozzle of elongated configuration wherein the gas discharged over the length of the nozzle may be selectively controlled to assure uniformity of action of the gas on the fibers being drawn from an orifice plate.

With respect to the latter object, another and related object of the invention is to provide for the controlled bulk flow of gas to the undersurface of an orifice plate so as to maintain separation of the cones of glass being drawn from the plate and, thus: (1) provide stable cone formation; (2) prevent flooding of the plate; (3) eliminate stagnant gas adjacent the plate; (4) provide for uniformity of the fibers being formed; and, (5) control cooling and resultant tempering of the fibers.

A further object of the invention is to provide a bulk gas flow nozzle which permits control of the angle of incidence at which gas is directed to the undersurface of an orifice plate.

Another object of the invention is to provide a bulk gas supply system for use in directing gas to the undersurface of an orifice plate whereby the size of the fibers being drawn from the plate may be controlled by controlling the rate of cooling affected by the gas flow (faster cooling results in large figers and, conversely, slow cooling results in thinner fibers).

The specifics of the invention and the foregoing and other objects will become more apparent when viewed in light of the accompanying drawings and the following description.

BRIEF DESCRIPTION OF THE DRAWINGS

FIG. 1 is a diagrammatic view illustrating a bushing assembly of the type disclosed in the aforementioned co-pending application, with the control system of the present invention applied thereto;

DESCRIPTION OF THE ILLUSTRATED EMBODIMENT

Figure 3:
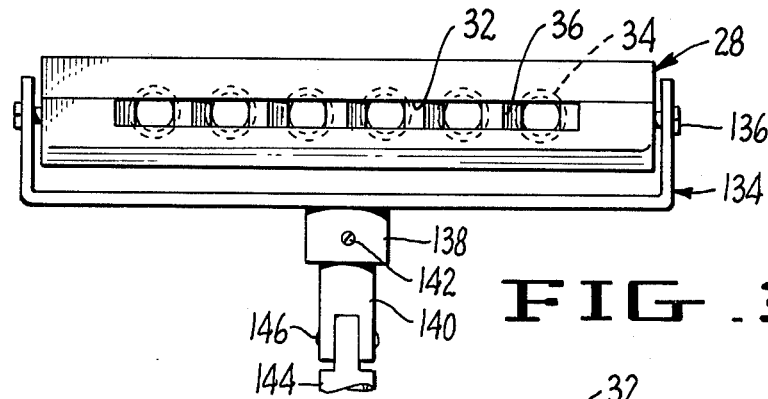
FIG. 3 is a top plan view of the nozzle illustrated in FIG. 2.
Figure 2:
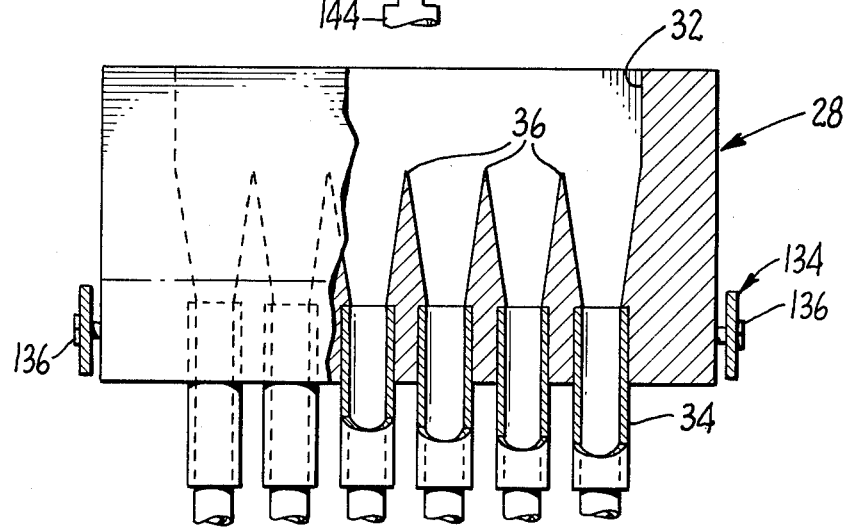
FIG. 2 is an elevational view, with parts thereof broken away to show interior detail, illustrating the bulk supply nozzle employed with the control system of the present invention.

Referring now to FIG. 1, the bushing assembly shown therein is designated in its entirety by the numeral 10 and is shown mounted beneath a flow block 12 which defines the underside of a direct melt forehearth. The forehearth contains molten glass 14 and a flow passage 16 within the flow block communicates the glass with a flow chamber 18 formed in the bushing assembly 10. The bottom of the flow chamber 18 is closed by an orifice plate 20 having a perforated drawing area 22 through which glass fibers, designated 14a, are drawn.

The above-described bushing assembly 10 and flow block 12 are identical to those described in the aforementioned co-pending application, and a more detailed illustration and description of their structure and mode of operation may be found in that application.

Figure 4:
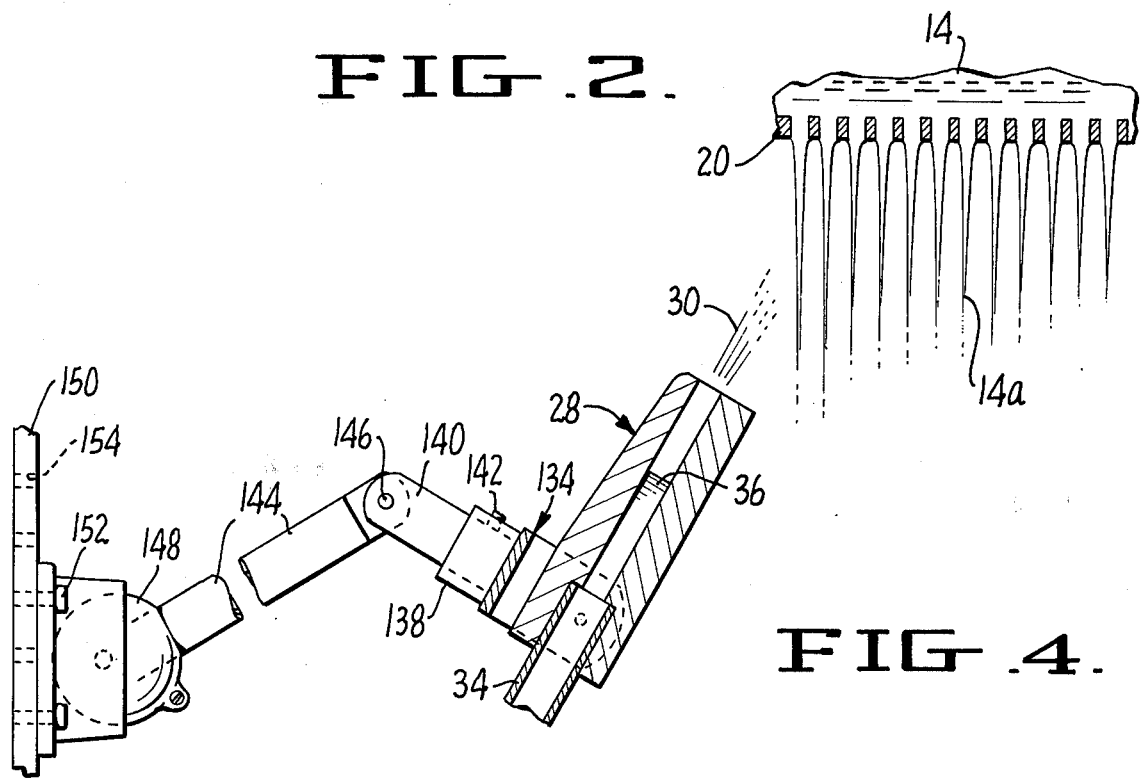
FIG. 4 is a cross-sectional view, with parts thereof broken away, diagrammatically illustrating the operation of an orifice plate and bulk gas supply nozzle of the type with which the control system of the present invention would be typically employed.

The basic drawing assembly illustrated in FIG. 1 is completed by a gathering shoe and binder applicator assembly 24, a collet winding mechanism 26, and a bulk gas supply nozzle 28. The assembly and mechanism are of conventional construction and illustrated in more detail in the aforementioned co-pending application. The bulk gas supply nozzle 28 is mounted beneath the bushing assembly 10 in a position wherein gas discharged therefrom is directed against the undersurface of the orifice plate 20. The relative positions of the nozzle and orifice plate may best be seen from FIG. 4 wherein gas 30 is shown being discharged against the undersurface of the orifice plate. FIG. 4 also shows the coning of the glass fibers 14a as they are drawn from the orifice plate.

The nozzle 28 comprises a body having an elongate discharge passage 32 through which gas exits and a plurality of individual inlet conduits 34 leading into the discharge passage over the length thereof. Guide elements 36 within the nozzle provide divergent mouths which lead from the inlet conduits 34 into the elongate passage 32.

Gas is supplied to the nozzle 28 through means of a manifold 38 which receives gas through an inlet pipe 40 and directs this gas to the respective inlet conduits 34 through tubes 42. Each tube 42 is secured to the manifold 38 through means of a valve 44 having a selectively variable flow area. The valves 44 may be selectively operated to adjust the gas flow to the respective inlet conduits 34.

The aforementioned nozzle and manifold provide means whereby bulk gas flow to the undersurface of the orifice plate may be selectively varied over the width of the plate so as to maintain the desired separation of cones of glass being drawn from the plate. Adjustment is also provided by an adjustable mounting for the nozzle, as will be described in the subsequent discussion.

The inlet pipe 40 has a main flow control valve 46 interposed therein and from the valve 46 the conduit 40 leads to a flow additive parallel supply circuit 50. The circuit 50 is connected, in series, with the inlet pipe 40 and comprises three conduits, 52, 54 and 56, respectively, connected in parallel with one another through connecting conduits 58 and 60. The connecting conduit 60 is connected to a main air supply line 62 having pressure regulators 64 interposed therein to either side of its connection to the conduit 60. The arrow line and legend in FIG. 1 illustrate the direction from which air is supplied to and through the main air supply line 62. The end of the line 62 opposite its supply end is connected to an air lance 66. Flow through the lance is normally closed and a trigger operated valve provides means whereby the flow through the lance may be opened. The lance is connected to the line 62 by a flexible hose to facilitate use of the lance in conventional manner to assist in clearing and startup operations.

The basic structure of the supply circuit 50 is completed by selectively adjustable flow control valves 68, 70 and 72 interposed in the conduits 52, 54 and 56, respectively, and solenoid operated shutoff valves 74 and 76 interposed in the conduits 52 and 54, respectively. The flow control valves provide means whereby the flow through the conduits 52, 54 and 56 may be selectively restricted and the valves 74 and 76 provide means whereby the flow through the conduits 52 and 54 may be shut off.

The solenoid valves 74 and 76 are normally in a closed condition and, thus, the supply of air to the inlet pipe 40 is normally limited to the restricted flow provided by the conduit 56. The supply of air to the pipe 40 may be increased in additive fashion by selectively energizing one or both of the solenoid operated valves 74 and 76 to permit air throughflow to the conduits 52 and/or 54.

As will be developed in more detail subsequently, the aforedescribed air supply system is controlled through the control system forming the subject of the present invention and works in conjunction with a water supply and temperature control. The water supply is provided to selectively spray a fine spray of water against fibers being drawn from the bushing assembly and comprises a water pipe 78 having a solenoid operated shut-off valve 80 interposed therein and a spray nozzle 82 disposed at its distal end adjacent the undersurface of the orifice plate 20. The arrow line and legend shown in FIG. 1 indicate the source of water for the pipe 78. The temperature control comprises: an electrical current resistance heater formed by the orifice plate 20, a reinforcing plate 84, and bushing chamber side walls secured thereto; a pair of electrical leads 86 connected to the orifice plate 20 to opposite sides of the drawing area thereof; a thermo-couple suppression bridge 88 connected to the leads 86; a thermo-couple 90 secured to the bushing assembly 10 and having a probe 92 extending into the bushing chamber 18; and, a pair of input leads 94 extending from the thermo-couple 90 to connection with the suppression bridge 88. Leads 96 indicate the power input for the temperature control circuit.

The circuit 50 is embodied as part of a main control unit, designated 98. The unit 98 contains the power supply and relay logic necessary to coordinate the functions of the control system. Power is supplied to the unit by power leads 100 connected thereto. The leads 100 connect to a power supply within the unit 98 in conventional manner.

The principal control of the main control unit 98 is effected through means of an operator control panel 102 electrically connected to the control unit by input leads 104, 106 and 108, respectively. The panel 102 contains a mode selector switch 110, a temperature suppression switch 112 and a manual override temperature control switch 114 connected, respectively, to the input leads 104, 106 and 108.

Switch 110 is a double-pole double-throw switch and provides for switching of the main control unit to either a "normal" mode or a "break out" mode. Indicator lights 116 are provided to indicate the mode position of the switch. When in the normal mode, the switch functions to close the solenoid operated shut-off valve 76 and to permit normal operation of the thermo-couple suppression bridge 88 and the collet 26. When in the break out mode, the switch 110 functions to open to solenoid operated valve 76, to switch a parallel resistance 118 into the thermo-couple suppression bridge 88, and to modify the precision transformer control, designated 120, for the collet to permit the collet to coast to a stop without the normal braking action. The latter operation is accomplished by by-passing the rated brake stop. In normal operation, a stop switch activates the rated stop. Leads 122 connect the suppression bridge 88 to the switch 110 through a relay (not illustrated) within the main control unit 98 and leads 124 connect the control 120 to the switch 110 through a relay (not illustrated) within the main control unit 90 and leads 124 connect the control 120 to the switch 110 through a relay (not illustrated) within the main control unit.

The temperature suppression switch 112 is a single-pole double-throw switch and operates to provide for the insertion of alternate parallel resistances into the thermo-couple suppression bridge 88. One of these resistances is the aforedescribed resistance 118 and the other is designated by the numeral 126. The resistances 118 and 126 are, alternately, switched into parallel resistance with the bridge 88, depending upon the position of the switch 112, and function to make it appear to the bridge that the probe 92 of the thermo-couple 90 is above set point temperature and, thus, function to reduce electrical current flow through the bushing.

The thermo-couple suppression bridge 88 is part of an "off-the-shelf" bushing temperature control unit, modified to allow the remote temperature switching. Remote control is accomplished by switching parallel resistance into the thermo-couple suppression bridge. It might also be accomplished by adding a millivoltage to the thermo-couple unit. Either of these means make the bushing appear hotter than it actually is.

The precision transformer collet control 120 is also an off-the-shelf unit, with modifications. The basic modification allows the collet to coast to a stop when a break out is detected. This is accomplished by by-passing the rated brake stop. In normal operation, a stop switch activates the rated brake stop. In the break out mode, the holding relay of the stop is deactivated without activating the rated stop circuit.

The switch 114 is a single-pole triple-throw switch and is operable to manually insert one or the other of the two resistances in parallel with the bridge 88 to effect temperature suppression of the bushing assembly 10, or to remove both of these resistances. These resistances (not illustrated) are in addition to resistances 118 and 126 and effect temperature suppression independent of the latter resistances. The manual override provided by the switch 114 is available during collet operation to allow collet adjustments (speed, etc.) to be made without disturbing the bushing assembly.

In the embodiment illustrated, switching the mode selector switch 110 to the break out mode also actuates a relay which opens the solenoid operated valve 80 and, thus, activates the spray nozzle 82 to cool fibers being drawn from the bushing assembly. The inclusion of the spray nozzle circuit and the control therefor is optional, depending upon the circumstances under which the bushing assembly is used and the need for lowering of the temperature of the assembly. The leads between the main control unit 98 and the solenoid operated valve 80 are designated by the numeral 128.

In addition to the operator control 102, the main control unit 98 also has connected thereto a manually operated foot switch 130. The switch is provided so that the bulk gas flow to the underside of the orifice plate 20 may be maximized for clearing purposes. The switch operates by actuating a relay (not illustrated) within the main control unit which, in turn, opens both of the solenoid operated valves 74 and 76. Thus, upon triggering of the switch, gas is supplied through all three conduits of the flow additive parallel supply circuit 50 (i.e., through conduits 52, 54 and 56). The switch 130 is connected to its associated relay within the main control unit 98 through means of leads 132.

Selective adjustment of the effect of bulk gas flow impinging on the underside of the plate 22 is also provided through means of a mounting which permits control of the elevation of the nozzle relative to the plate and control of the angle of incidence at which gas is directed to the undersurface of the plate. The mounting may best be seen from FIG. 4 and comprises: a bifurcated bracket 134 spanning the nozzle and bolted thereto by bolts 136 which may be selectively loosened and tightened to adjust the angle at which the nozzle is secured to the bracket; a sleeve 138 secured to the bracket and telescopically received on a first arm for pivotal movement about the axis of the arm; a set screw 142 to selectively lock the sleeve against rotation relative to the arm 140; a second arm 144 pivotally attached to the first arm 140 by a selectively operable locking bolt 146; a selectively lockable ball joint 148 receiving the end of the arm 144 remote from that secured to the arm 140; and a mounting plate 150 supporting the ball joint. The ball joint 148 is secured to the plate 150 by bolts 152 and a plurality of threaded holes 154 are provided within the plate whereby the bolts may be used to secure the ball joint to the plate at varying elevational positions.

SUMMARY OF OPERATION

The operator's controls consist of a foot switch 130 which increases "bulk gas" flow to the underside of the orifice plate when depressed and an operator's control unit which contains mode and temperature selection switches.

The operator may select from three preset temperature settings and two preset bulk gas levels during handling to provide the best conditions for clearing. The temperature settings are provided by the manual override temperature control switch 114. The two preset bulk gas levels are provided by the foot switch 130.

The mode selector switch 110 initiates a programmed sequence of events when break-out is detected. The sequence includes: (1) raising the bulk gas level; (2) reducing bushing temperature; (3) allowing the collet to coast slowly to a stop; (4) spraying water against the fibers being drawn from the underside of the orifice plate. The purpose of the sequence is to slow or to stop the growth of a flood until clearing can begin.

CONCLUSION

From the foregoing detailed description and accompanying drawings, it is believed that the present invention enables the attainment of the objects initially set forth herein. It should be understood, however, that the invention is not intended to be limited to the specifics of the illustrated embodiment, but rather is defined by the accompanying claims.

What is claimed is:

1. In a method of drawing glass fiber comprising operating a bushing assembly having an orifice plate with a drawing area having a flat undersurface through which fibers are drawn, by drawing glass fibers from the plate with a collet, supplying bulk gas against the undersurface of the plate with a bulk supply nozzle, and heating molten glass within the bushing assembly with an electrical current heater to condition the glass for drawing through the drawing area of the plate, a method for controlling flooding comprising the steps of selectively: (1) reducing the drawing action of the collet, without abruptly stopping the collet, by permitting the collet to coast slowly to a stop, (2) increasing the flow of bulk gas through the supply nozzle to an amount sufficient to further cool, and thus increase the viscosity of, the glass being drawn from the orifice plate to retard the rate of flooding of the plate, and (3) lowering the temperature to which the heater heats molten glass within the bushing to thereby increase the viscosity of the glass within the bushing assembly to retard the rate of flooding of the plate; said steps being carried out in coordinated fashion in response to the break out of glass being drawn from the orifice plate.

2. In a method of drawing glass fiber, according to claim 1, the method for controlling flooding further comprising: directing a fine spray of water against fibers being drawn through the plate in response to the break out of glass being drawn from the plate.

3. An improved system for use in supplying gas to a bushing assembly used for the drawing of glass fibers, said system comprising: a nozzle having a plurality of individual inlet conduits and an elongate discharge passage communicating with said conduits whereby individual streams of gas may enter the nozzle through the inlet conduits and gas may exit the nozzle through the discharge passage in bulk flow form; manifold means for supplying gas to the inlet conduits of the nozzle, said means having valves to individually control the gas supplied to the respective inlet conduits; a plurality of restricted flow conduits connected in parallel relationship to one another and in series relationship to the manifold means to supply gas thereto; and, a solenoid operable closure valve disposed in at least one of said restricted flow conduits to selectively open or close the conduit to the flow of gas therethrough.

4. In combination with a bushing assembly for the drawing of glass fibers, said assembly having an orifice plate with a perforated drawing area having a generally planar undersurface, an improved system for supplying cooling gas to the undersurface of the drawing area, said system comprising:

a nozzle having a plurality of individual inlet conduits and an elongate discharge passage communicating with said conduits whereby individual streams of gas may enter the nozzle through the inlet conduits and the gas may exit the nozzle through the discharge passage in elongate bulk flow form;

means supporting the nozzle beneath the bushing assembly in a position wherein gas exiting the nozzle is directed against the undersurface of the perforated drawing area of the orifice plate; and, manifold means for supplying gas to the inlet conduits of the nozzle, said means having valves to individually control the gas supplied to the inlet conduits.

5. In a combination, according to claim 4, the improved system wherein the means supporting the nozzle includes adjustment means whereby the angular orientation of the nozzle relative to the undersurface of the drawing area may be selectively varied.

6. In a glass fiber drawing assembly comprising a blushing assembly having an orifice plate with a drawing area having a flat undersurface through which fibers are drawn, a collet for drawing glass fibers from the plate, a supply nozzle for directing bulk gas against the undersurface of the plate, and a heater for heating molten glass within the bushing assembly to condition the glass for drawing through the drawing area of the plate, apparatus for supplying bulk gas to the nozzle and instantaneously increasing or decreasing the flow of gas to the nozzle, said apparatus comprising: a series of restricted flow conduits connected to one another in parallel relationship; means securing said conduits in series communication with said nozzle; a valve located in at least one of said conduits to normally maintain said one conduit in a closed condition; and, means to energize the valve to open said at least one conduit to increase the flow of bulk gas through the nozzle in response to a breakout condition of fibers being drawn from the orifice plate.

7. In a glass fiber drawing assembly comprising a bushing assembly having an orifice plate with a drawing area having a flat undersurface through which fibers are drawn, a collet for drawing glass fibers from the plate, a supply nozzle for directing bulk gas against the undersurface of the plate, and a heater for heating molten glass within the bushing assembly to condition the glass for drawing through the drawing area of the plate, apparatus for supplying bulk gas to the nozzle and instantaneously increasing or decreasing the flow of gas to the nozzle, said apparatus comprising: a series of restricted flow conduits connected to one another in parallel relationship, and connected to said nozzle in series relationship, at least one of said conduits being in a normally open condition; valves in at least two of said conduits to maintain said at least two conduits in a normally closed condition; means to energize at least one of the valves to open the conduit in which said valve is located in response to a breakout condition of fibers being drawn from the orifice plate; and, means to energize at least two of the valves to open the conduits in which said valves are located to increase the supply of bulk gas to the supply nozzle to clear the undersurface of the orifice plate.

8. In combination with a bushing assembly for the drawing of glass fibers, said assembly having an orifice plate with a perforated drawing area having a generally planar undersurface, an improved system for supplying cooling gas to the undersurface of the drawing area, said system comprising:

a nozzle having a plurality of individual inlet conduits including discharge means whereby individual streams of gas may enter the nozzle through the inlet conduits and the gas may exit the nozzle through the discharge means in bulk flow form;

means supporting the nozzle beneath the bushing assembly in a position wherein gas exiting the nozzle is directed against the undersurface of the perforated drawing area of the orifice plate; and, manifold means for supplying gas separately to the inlet conduits of the nozzle, said means having valves to individually control the gas supplied to the inlet conduits.

* * * * *